United States Patent Office 3,636,137
Patented Jan. 18, 1972

3,636,137
BIS[o(CARBO - 2 - ETHYLHEXOXY)-BENZOYL]
PEROXIDE AS POLYESTER CURING AGENT
Hans G. Gerritsen, Deventer, Hendrik Hansma, Schalkhaar, and Hans Jaspers, Deventer, Netherlands, assignors to Koninklijke Industrieele Maatschappij Noury & Van Der Lande N.V., Deventer, Netherlands
No Drawing. Original application Apr. 26, 1967, Ser. No. 633,703. Divided and this application June 5, 1969, Ser. No. 850,278
Claims priority, application Netherlands, May 6, 1966, 6606159
Int. Cl. C08f 21/00, 21/02
U.S. Cl. 260—861                    1 Claim

ABSTRACT OF THE DISCLOSURE

The present invention relates to a new ortho-substituted dibenzoyl peroxide, viz bis[o - (carbo - 2 - ethylhexoxy)-benzoyl] peroxide capable of use as an initiator in the peroxidic polymerization of vinyl monomers and in the copolymerization of unsaturated polyester resins containing vinyl monomers as copolymerizable monomers; the invention also relates to a process for preparing bis[o-(carbo-2-ethylhexoxy)-benzoyl] peroxide and to the use of said peroxide as an initiator in the peroxidic polymerization of vinyl monomers and in the copolymerization of unsaturated polyester resins containing vinyl monomers as copolymerizable monomers.

This application is a divisional application of Serial No. 633,703 filed Apr. 26, 1967.

BACKGROUND OF THE INVENTION

Field of the invention

The present invention lies in the field of a novel organic peroxidic compound viz, bis-[o-(carbo - 2 - ethylhexoxy)-benzoyl] peroxide, methods for its synthesis, its use in the peroxidic polymerization of vinylmonomers and in the copolymerization of unsaturated polyester resins containing vinyl monomers as copolymerizable monomers.

Description of the prior art

It is known that vinyl monomer may be polymerized and that unsaturated polyester resins containing vinyl monomers as copolymerizable monomers may be copolymerized by means of free-radical generating compounds, for example organic peroxides, e.g. benzoyl peroxide.

The expression "vinyl compound" is to be understood to mean any compound containing a $H_2C=C<$ group, such as styrene, vinyl toluene, vinyl chloride, vinyl acetate or methyl methacrylate.

The expression "unsaturated polyester resin" is to be understood to mean a mixture of an unsaturated polyester and a monomer containing one or more $H_2C=C<$ groups. Unsaturated polyesters may be obtained by reacting a polyhydric alcohol, such as ethylene glycol, propylene glycol or diethylene glycol, with an unsaturated dibasic carboxylic acid, for example maleic acid, fumaric acid or itaconic acid, if desired in the presence of a saturated acid, for example malonic acid, adipinic acid, sebacinic acid or tartaric acid or also of phthalic acid, isophthalic acid or tetrachlorophthalic acid.

The weight ratio of monomer to unsaturated polyester generally ranges from 30–50 parts of monomer to 70–50 parts of polyester.

In the polymerization of vinyl monomers and in the copolymerization of vinyl monomers and polyester resins, benzoyl peroxide is mostly used as a free-radical generating compound. However, this peroxide has the disadvantage that it is a solid, impact-sensitive compound, and, moreover, it dissolves with difficulty in the plasticizers usually employed in the plastics industry. For reasons of safety, this peroxide therefore has to be transported and used in diluted forms, for example in the form of a 50% paste. However, it is difficult to mix such a paste with and measure it into, for instance, a viscous polyester resin.

In the Journal of the American Chemical Society, 65, (1943), pages 1647–1651, reference is made to the menthyl ester of bis(o-carboxy-benzoyl)peroxide. However, the application of this peroxide is not stated.

In the Journal of the Chemical Society, (1951), page 3106 et seq., the influence of the structure of symmetrically substituted dibenzoyl peroxides, e.g. bis[o-(carbo-methoxy)-benzoyl]-peroxide on the polymerization of styrene, is described.

Just like benzoyl peroxide, however, bis[o-(carbo-methoxy)-benzoyl]-peroxide is a solid, impact-sensitive compound, and, moreover, it is soluble only to a very slight extent in the plasticizers usually employed in the plastics industry. For this reason, this peroxide has not come into use in idustry.

SUMMARY OF THE INVENTION

It has now been found according to the present invention that the previously unknown bis[o-(carbo-2-ethylhexoxy)-benzoyl]-peroxide is very well suited, for use as an initiator in the polymerization of vinyl monomers and in the copolymerization of vinyl monomers and polyester resins, because it is a liquid and is not an impact-sensitive compound. This new compound can be added as such, that is to say, in a non-desensitized form, to the monomer or monomer mixture to be polymerized in a quick and simple way, without adding plasticizers or other compounds which would be detrimental to the finished polymer by decreasing its temperature of deformation.

When the compound according to the invention is used in the copolymerization of polyester resins at room temperature, it is efficient to operate in the presence of accelerators such as are also used in conjunction with benzoyl peroxide for the same purpose, for example dimethyl aniline and diethyl aniline. Under these circumstances, the peroxide according to the invention appears to give a more rapid gelation and hardening than the benzoyl peroxide hitherto used.

The peroxide according to the invention may be prepared by reacting a solution of the acid chloride of mono-2-ethyl-hexyl-phthalate in benzene with an alkaline aqueous hydrogen peroxide solution. This is an example of a general preparation which is described in Berichte, 34, (1901), 765.

DESCRIPTION OF THE PREFERRED EMBODIMENTS

In order still better to illustrate the nature of the present invention the following detailed examples are set forth, it being understood, however, that this description and these examples are presented here by way of illustration only and not as limiting the scope of the invention.

Example 1

1400 ml. of demineralized water, 149 g. of 50% $H_2O_2$ (2.19 mole) and then, with stirring and cooling, 531 g. of 33% NaOH (4.38 mole) were introduced into a 3-neck flask provided with a thermometer, stirrer and thistle funnel. Subsequently, 4 ml. of a 5% solution of the Na-salt of dodecyl-benzene-sulfonic acid was added and then, with vigorous stirring over a period of 1 hour, 1000 g. of mono-2-ethyl-hexyl-phthaloyl chloride (3.37 mole) in 1000 ml. of benzene, care being taken that the temperature of the reaction mixture did not rise above 10° C. After another 2 hours of stirring, the reaction mixture was washed once with 400 ml. of demineralized water, once with 200 ml. of 1 N NH$_4$OH and once with a 20% NaCl solution and then dried and filtered. After filtration, the benzene was distilled off at a temperature of about 35° C. and a pressure of 5 mm. Hg. 836 g. of a yellow viscous liquid were obtained. $n_D^{20}$ 1.5159; active oxygen content: 2.75%; yield: 86%.

Example 2

0.05 part of diethyl aniline and 50 parts of a catalyst paste consisting of 40 parts of bis[o-(carbo-methoxy)-benzoyl]peroxide and 60 parts of dibutyl phthalate were successively dissolved in 100 parts of a medium-reactive, all-purpose, unsaturated polyester resin, namely that known as "Palatal" P 6. The all-purpose unsaturated polyester resin known Palatal P 6 has the following composition: 65% by weight of unsaturated polyester, 35% by weight of styrene and 0.01% by weight of hydroquinone.

The unsaturated polyester resin is prepared by esterifying at 210° C., stirring one mol of maleic anhydride, under a current of an atmosphere of nitrogen, with one mol of phthalic anhydride, 1.1 mol of ethylene glycol and 0.1 mol of 1,2 propylene glycol until an acid value of 50 has been obtained. After mixing the polyester with styrene in the ratio of 65 parts by weight of polyester to 35 parts by weight of styrene and adding 0.01% by weight of hydroquinone, the unsaturated polyester resin is ready for use. This resin is described in "Handbuch der BASF Kunststoffe" 4th edition, 1959 and "Palatal als Rohstoff fur die Lackindustrie," 1962, edited by BASF. The mixture obtained was hardened in a mould for 24 hours at temperature of 20° C. and then for 3 hours at a temperature of 80° C.; bars with the dimensions of 12.5 x 1.05 x 0.4 cm. were obtained.

Under similar circumstances, bars of the same dimensions were made using, instead of the catalyst paste described, either 4 parts of a paste consisting of 50 parts of bis[o(-carbomethoxy)-benzoyl]peroxide and 50 parts of dibutyl-phthalate or 3.4 parts of 95% bis[o-(carbo-2-ethyl-hexoxy)-benzoyl]peroxide.

The temperature of deformation of the bars was determined according to A.S.T.M. Designation: D 648-56 under a bending stress of 4.6 kg./cm.$^2$.

The results obtained are tabulated hereafter.

|  | Parts | | |
|---|---|---|---|
| Composition: | | | |
| Palatal P 6 | 100 | 100 | 100 |
| Diethylaniline | 0.05 | 0.05 | 0.05 |
| Bis[o-(carbo-methoxy)-benzoyl]-peroxide 40% in dibutylphthalate | 5 | | |
| Bis[o-(carbo-methoxy)-benzoyl]-peroxide 50% in dibutylphthalate | | 4 | |
| Bis[o-(carbo-2-ethylhexoxy)-benzoyl]-peroxide 95% | | | 3.4 |
| Temperature of deformation in ° C. | 55 | 57 | 65 |

Example 3

In a medium-reactive, all-purpose, unsaturated polyester resin "Palatal" P 6, the gel times were determined with bis[o-(carbo - 2 - ethylhexoxy)-benzoyl]peroxide as such and with benzoyl peroxide as a 50% paste at a temperature of 20° C., using dimethyl aniline as an accelerator.

The results obtained are tabulated below.

|  | I | II |
|---|---|---|
| Palatal P 6 | 100 | 100 |
| Peroxide A | 2 | |
| Peroxide B | 1.1 | 2.5 |
| Dimethyl aniline | 0.05 | 0.05 |
| Gel time at 20° C., min | 8 | 4 |

Peroxide A=Dibenzoyl peroxide paste 50%, active oxygen 3.3%.
Peroxide B=Bis[o-(carbo-2-ethylhexoxy)-benzoyl] peroxide 90%, active oxygen 2.6%.

The dosage according to column I was such that, compared with dibenzoyl peroxide, an equivalent quantity of peroxide was added.

The dosage according to column II was such that, compared with dibenzoyl peroxide, an equivalent quantity of active oxygen was added.

Example 4

The impact-sensitiveness of a number of peroxides was determined according to the method of Koenen, as described in the international transport regulations, DOC OC/RID—XVII/1 bis dated 6.4.1964.

The results are tabulated below.

| Peroxide | Impact-sensitiveness | |
|---|---|---|
| Benzoyl | 0.04 kgm | Complete decomposition. |
| Bis(o-carbo-methoxybenzoyl) | 0.04 kgm | Do. |
| Bis[o-(carbo-2-ethylhexoxyl)-benzoyl] | >5 kgm | No decomposition. |

Example 5

Styrene and bis[o-(carbo-2-ethylhexoxy)-benzoyl]peroxide were put into an ampoule. Subsequently the ampoule was melted and then the styrene was polymerized at a temperature of 70° C.

In a similar manner, methyl methacrylate and vinyl acetate were polymerized.

Under similar circumstances, comparative experiments were carried out with benzoyl peroxide as the reference peroxide. The reaction conditions of the conversions obtained are tabulated hereafter.

| Monomer | Peroxide | | | Reaction temp., (° C.) | Conversion in percent after stated number of hours | | | |
|---|---|---|---|---|---|---|---|---|
|  | Type | Active O in percent | Conc. in wt. percent |  | 3 h. | 5 h. | 10 h. | 23 h. |
| Styrene | 1 | 6.5 | 0.4 | 70 |  |  | 40 | 98 |
|  | 2 | 2.6 | 1.0 | 70 |  |  | 43 | 99 |
| Methyl methacrylate | 1 | 6.5 | 0.09 | 65 | 90 |  |  |  |
|  | 2 | 2.6 | 0.22 | 65 | 92 |  |  |  |
| Vinyl acetate | 1 | 6.5 | 0.09 | 70 |  | 87 |  |  |
|  | 2 | 2.6 | 0.22 | 70 |  | 90 |  |  |

NOTE. Type 1=benzoyl peroxide 98%.
Type 2=bis[o-(carbo-2-ethylhexoxy)-benzoyl] peroxide 90%.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:
1. A curable mixture consisting essentially of:
   (a) a vinyl compound; and
   (b) a polyester of a dihydric alcohol compound and an alpha-beta ethylenically unsaturated acid; and
   (c) bis[o-(carbo-2-ethylhexoxy)-benzoyl]peroxide.

References Cited
UNITED STATES PATENTS 3,367,994  2/1968  Parker et al. _____ 260—864

WILLIAM H. SHORT, Primary Examiner

E. A. NIELSEN, Assistant Examiner

U.S. Cl. X.R.

260—473 G, 864